(12) United States Patent
Seidl et al.

(10) Patent No.: US 7,421,539 B1
(45) Date of Patent: Sep. 2, 2008

(54) METHOD AND SYSTEM FOR CONCURRENT GARBAGE COLLECTION AND MUTATOR EXECUTION

(75) Inventors: Matthew L. Seidl, Longmont, CO (US); Gregory M. Wright, Mountain View, CA (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 263 days.

(21) Appl. No.: 10/849,081

(22) Filed: May 18, 2004

(51) Int. Cl.
 *G06F 12/00* (2006.01)
(52) U.S. Cl. .................. 711/133; 707/206; 711/170
(58) Field of Classification Search .................. 711/133
 See application file for complete search history.

(56) References Cited

U.S. PATENT DOCUMENTS 5,893,121 A * 4/1999 Ebrahim et al. ............. 707/206
6,021,469 A * 2/2000 Tremblay et al. ........... 711/125
6,490,599 B2 * 12/2002 Kolodner et al. ............ 707/206
6,671,707 B1 * 12/2003 Hudson et al. .............. 707/206

FOREIGN PATENT DOCUMENTS

WO  WO 01/44947 A1 * 6/2001

OTHER PUBLICATIONS

The Authoritative Dictionary of IEEE Standards Terms, Seventh Edition, 2000, IEEE Press pp. 273.*

* cited by examiner

*Primary Examiner*—Kevin Ellis
*Assistant Examiner*—Matthew Bradley
(74) *Attorney, Agent, or Firm*—Martine Penilla & Gencarella, LLP

(57) ABSTRACT

A method for concurrent garbage collection and mutator execution in a computer system includes scanning a first cache line for a non-local bit. The non-local bit is associated with a root object. A done bit associated with the first cache line is set. A second cache line to find a first object that is referenced by the root object is located. A mark bit and the done bit associated with the second cache line are set. The first and second cache lines are scanned for unset done bits. If an unset done bit is detected in either the first or the second cache line, then the cache line associated with the unset done bit is rescanned to determine whether there are any modified object references.

23 Claims, 8 Drawing Sheets

METHOD AND SYSTEM FOR CONCURRENT GARBAGE COLLECTION AND MUTATOR EXECUTION

CROSS REFERENCE TO RELATED APPLICATIONS

This application is related to: (1) U.S. Pat. No. 6,950,838, filed on Apr. 17, 2002, entitled "Locating References and Roots for In-Cache Garbage Collection"; (2) U.S. Pat. No. 7,246,141, filed on Jan. 2, 2003, entitled "Method and Apparatus for Skewing A Bi-Directional Object Layout to Improve Cache Performance; and (3) U.S. Pat. No. 6,859,868, filed on Feb. 7, 2002, entitled "Object Addressed Memory Hierarchy". Each of these U.S. patent applications is incorporated herein by reference.

BACKGROUND OF THE INVENTION

1. Field of the Invention

The present invention relates generally to garbage collection in a computer system, and in particular to garbage collection concurrent with mutator execution.

2. Description of the Related Art

As object-based systems become widespread, the need for systems supporting a large number of objects is increasing. As processor speeds rise, these object stores need to provide fast access to large collections of repeatedly used objects so that system throughput is not interrupted. FIG. 1 illustrates an example of a typical memory hierarchy for a conventional object-based system. The system includes a processor 10, which is connected to an object cache 12. The object cache 12 is connected to a translator 14, which is connected to main memory 16.

The object cache 12 is a form of fast memory holding recently accessed objects. A cache line in the object cache 12 generally contains part of an object or a whole object. When the objects in the object cache 12 are no longer accessible, they are typically reclaimed through a process known as garbage collection.

Garbage collection is the systematic reclamation of allocated memory of objects when these objects are no longer used by an executing program. To reclaim an allocated piece of memory, a garbage collector first identifies and marks all the reachable objects as "live". Live objects are those objects which may be reached from a root object or reference, and a root object is always deemed live.

One of the drawbacks of such a process is that in most cases the system is required to stop or pause the executing applications during garbage collection. An executing application program is generally referred to as a mutator and the application work is generally performed by mutator threads. At any given time there may be many mutator threads executing applications. Thus pausing the mutator threads during garbage collection may significantly decrease the performance of the system.

One solution to this problem has been to perform garbage collection concurrently with the mutator's execution of the application program. However, another problem arises when garbage collection is performed simultaneously with the mutator threads' execution of application programs. The mutator threads may create new objects or update memory references while the garbage collection is in progress. There exists a risk that the in-cache garbage collector may miss marking live objects and the live objects may then be subsequently reclaimed by the garbage collector.

FIG. 2 illustrates how an in-cache garbage collector (ICGC) might miss a live object during concurrent garbage collection. FIG. 2 shows six cache lines 20, 22, 24, 26, 30 and 32 having six objects, root "r", "a", "b", "c", "d", and "e" respectively with allocated memory. The cache lines have two bits associated with them: a mark bit 29 and a non-local bit 27. A root object is an object that is always deemed live and it differs from other objects because it has a non-local bit 27 set as indicated by the shaded non-local bit. A garbage collector starts at cache line 20 having the root object and traces all pointers from the root object and marks all objects encountered as live. In FIG. 2, object "a" and "b" are all marked as live as indicated by mark bit 27. However, when the ICGC scans cache line 24 it will not see any other object being referenced by object "b". Therefore, it will return to cache line 22. While the GC was scanning cache line 24 the mutator deleted the reference from object "a" to object "c" as shown by arrow 28. Subsequently, when the ICGC returns to cache line 22, the mutator thread adds a reference from object "b" to object "c" as indicated by the dotted arrow 23. Since the ICGC did not see the reference "c" while it was scanning the cache line 24; the ICGC will assume that object "c" is garbage and the memory allocated to object "c" would be subsequently reclaimed along with objects d and e. Obviously, the subsequent reclamation of the allocated memory of object "c" by the ICGC is a problem.

In view of the foregoing there is a need for an object-based system that conducts garbage collection and mutator execution with minimal mutator pauses, and further, there is a need for concurrent garbage collection and mutator execution without the erroneous reclamation of memory allocated to live objects.

SUMMARY OF THE INVENTION

Broadly speaking, the present invention fills these needs by providing a system and method for concurrent garbage collection and mutator execution by having an additional bit corresponding to each cache line in an object cache.

It should be appreciated that the present invention can be implemented in numerous ways, including as a process, an apparatus, a system, a device, or a method. Several inventive embodiments of the present invention are described below.

In one embodiment, a method for concurrent garbage collection and mutator execution in a computer system is provided. The method includes scanning a first cache line for a non-local bit, wherein, the non-local bit is associated with a root object. Then, the done bit associated with the first cache line is set. Subsequently, a second cache line is located to find a first object that is referenced by the root object. The next operation involves setting the mark bit and the done bit corresponding to the second cache line. Later, the first and second cache lines are then scanned for unset done bits. If an unset done bit is detected in either the first or the second cache line, then the cache line associated with the unset done bit is rescanned to determine whether there are any modified object references.

In another embodiment, a cache line for cached objects in a computer system is provided. The cache line includes a first bit for designating that the cache line corresponds to a root. A second bit is used for marking the cache line as being marked for further processing by the garbage collector. The cache line further includes a third bit for designating the cache line as being processed by the garbage collector. This third bit determines whether changes to words of the cache line have occurred since the last scan of that cache line by the garbage collector.

In another embodiment of the invention, a non-object cache line in a computer system is provided. The non-object cache line is always designated to be non-local. The non-object cache line includes a first bit for marking the non-object cache line as being marked for further processing by the garbage collector. The cache line further includes a second bit for designating the non-object cache line as being processed by the garbage collector. This second bit determines whether changes to words of the cache line have occurred since the last scan of that cache line by the garbage collector.

The advantages of the present invention are numerous. First, the method reduces system pauses or slowdowns during garbage collection. Second, the method prevents erroneous reclamation of allocated memory of objects. Third, the embodiments of the invention may be implemented in cache hardware to maintain synchronization with the ICGC. This enables elimination of overhead associated with software instructions, which improves time efficiency. Moreover, the embodiments of the invention track object reference updates at a finer granularity, i.e. at the level of cache lines.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention for concurrent garbage collection and mutator execution is provided. The embodiments of the invention include an extra bit in each cache line that tracks any changes to the object references within the cache line. This allows an in-cache garbage collector (ICGC) to selectively rescan those cache lines that were modified during garbage collection (GC). In accordance with one embodiment, the in-cache garbage collector maintains three bits of information per cache line. The first is a non-local bit, the second is a mark bit, and the third is a done bit. The done bit is used to signify that no object reference within the cache line has changed since the line was last scanned by the garbage collector. During the execution of a mutator, one embodiment of the invention includes an additional operation that includes unsetting the done bit for the cache line that has any object references added or changed. With this addition, the ICGC can spot any changes in object references in any part of a cache line and rescan those cache lines to ensure that the ICGC is not reclaiming the allocated memory of a live object.

Figure 1:
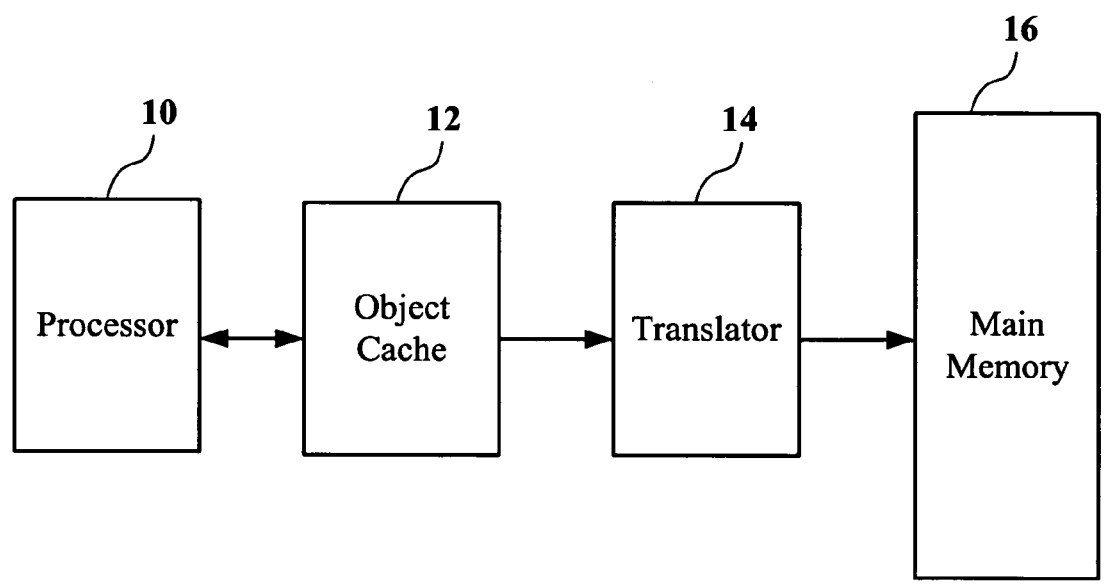
FIG. 1 is a high level schematic overview of an object-based computer system.
Figure 2:
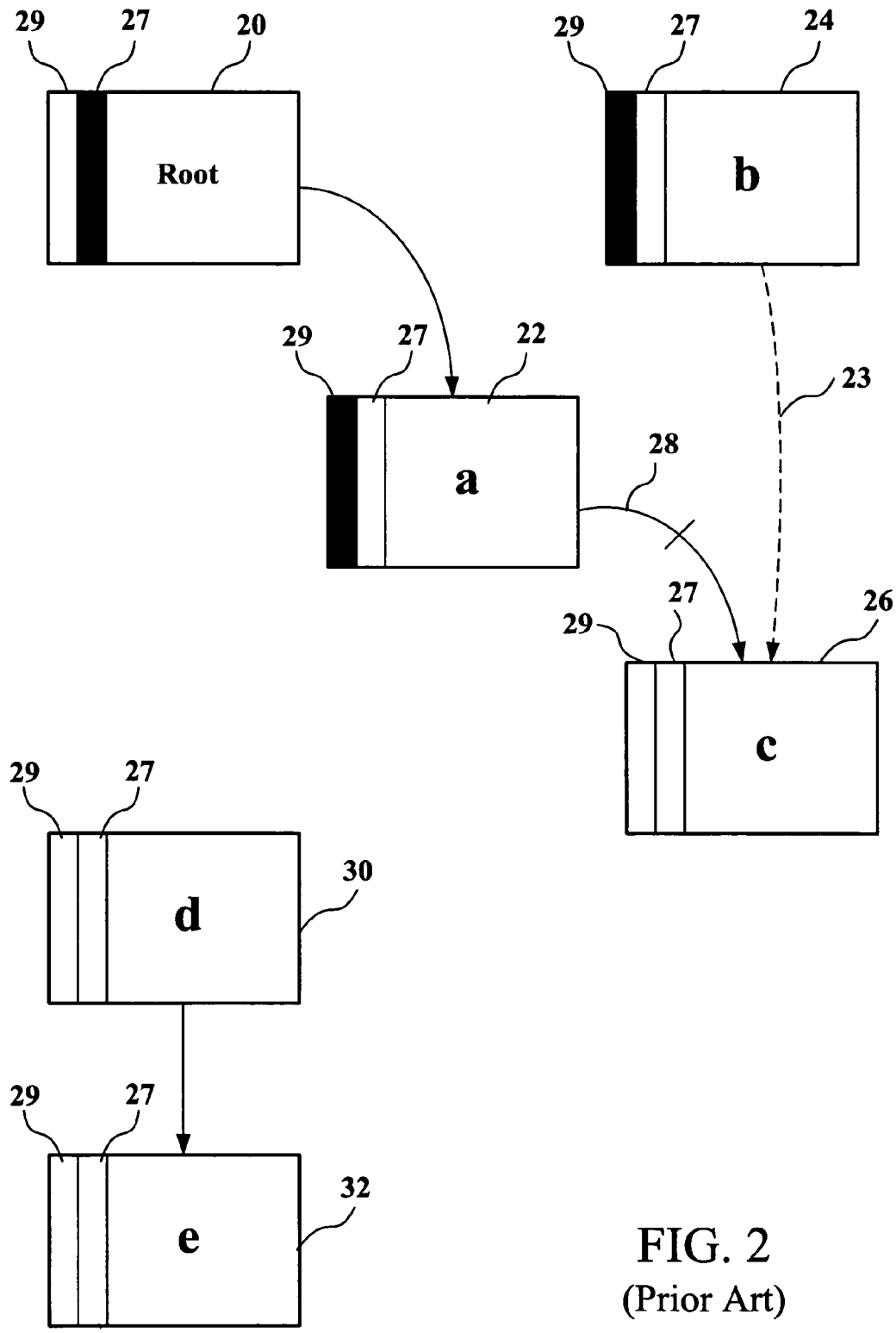
FIG. 2 illustrates cache lines having a non-local bit and a mark bit associated with each cache line.
Figure 3A:
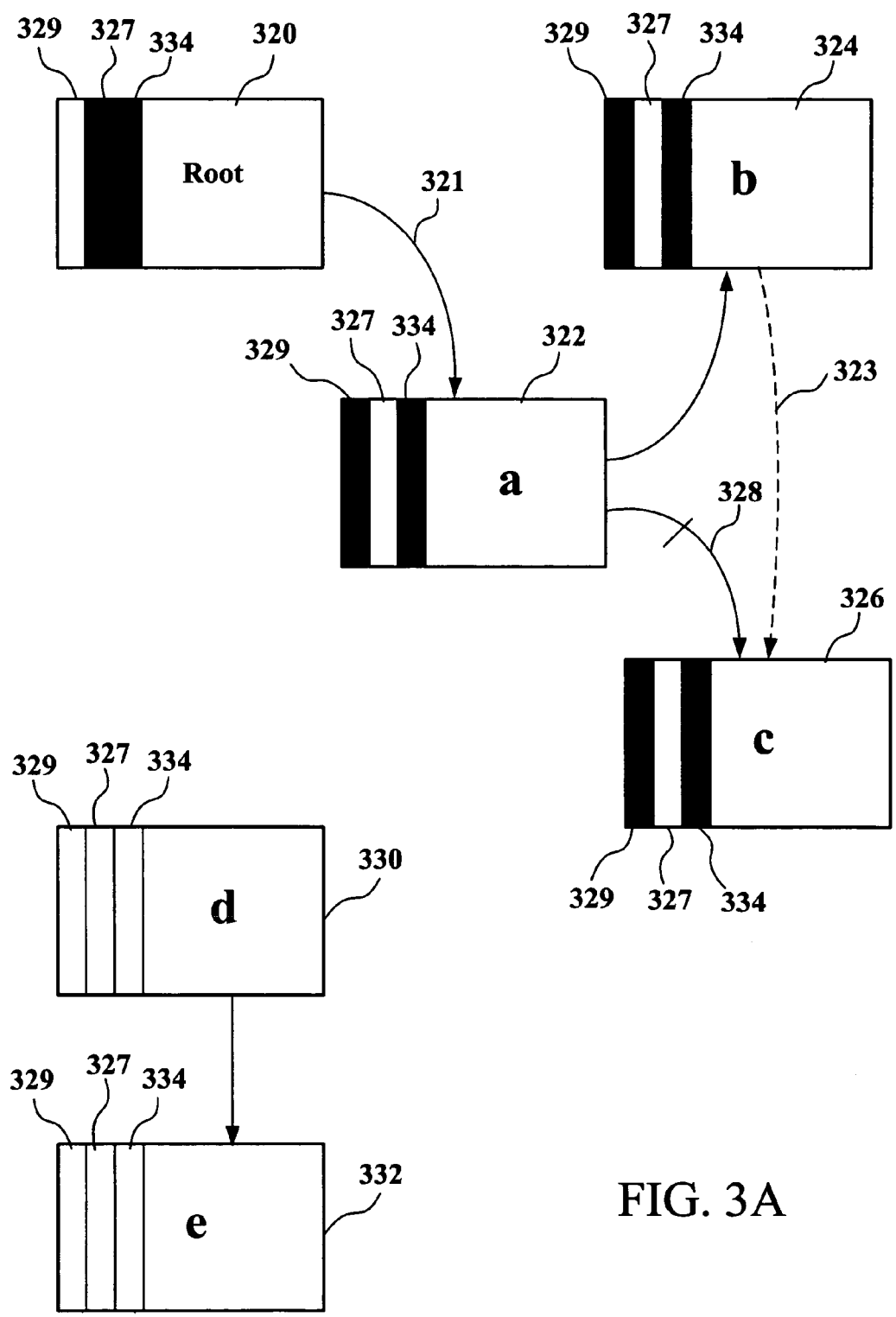
FIG. 3A illustrates cache lines having a done bit in addition to the non-local bit and the mark bit, in accordance with one embodiment of the invention.

FIG. 3A illustrates the concurrent garbage collection process in accordance with one embodiment of the present invention. FIG. 3A includes six cache lines 320, 322, 324, 326, 330 and 332 having objects root (r), "a", "b", "c", "d" and "e" respectively. As noted, each cache line includes 3 bits: a non-local bit 327, a mark bit 329 and a done bit 334. The non-local bit 327 indicates a root object, and a root object is always deemed live. The mark bit 329 is used to mark all the objects that are live during garbage collection. The done bit, when set, indicates that a cache line has been scanned during garbage collection; when not set, it indicates that the cache line has either not been scanned, or an object reference within the cache line was modified, and thus the line should be rescanned.

In this example, a garbage collector starts scanning the cache line 320 that contains a root object and sets the done bit 334 for the cache line 320. Next, the garbage collector traces all pointers from the root object. In this case the garbage collector sets the mark bit 329 and done bit 334 of cache lines 322 and 324, as the object "a" is referenced directly from the root object and the reference to "b" is found during a partial scan of cache line 322. While the garbage collector scans the cache line 324 containing "b", the mutator deletes the reference from object "a" to object "c" as indicated by arrow 328. When the ICGC returns to cache line 322, the mutator adds a reference from object "b" to object "c" as indicated by dotted arrow 323. The mutator is designed to simultaneously unset the done bit 334 as it makes any modifications to object references in a cache line. The ICGC is designed to rescan the done bits of the cache lines prior to reclaiming the allocated memory of an object.

Therefore, the ICGC subsequently rescans cache lines having set mark or non-local bits and unset done bits as those lines have had their object references modified. In this particular example, the mutator will simultaneously unset the done bit for the cache line 324 as it adds the reference from "b" to "c". When the ICGC scans the done bits the ICGC will identify that the done bit for cache line 324 is unset. Therefore, the ICGC will rescan the cache line 324 and will identify the pointer 323 from the object "b" to the object "c" and will mark object "c" as live and will not reclaim the memory allocated to object "c". The objects that will be reclaimed in this example are object "d" and object "e", as they are not referenced directly or indirectly by the root.

In one embodiment of the invention, the process allows references to objects from non-object locations, such as a stack, and these references may also be roots for the ICGC. Thus far, the present invention described non-local objects as being roots, which they are, but it is understood that there can be other roots besides non-local objects. The present invention is configured to catch modifications to references in these non-object cache lines. As described above, the 'done' bit is set when the non-object cache lines get rescanned. Non-object cache lines cannot be collected, so they are always live and act for GC purposes just as non-local object cache lines.

Figure 3B:
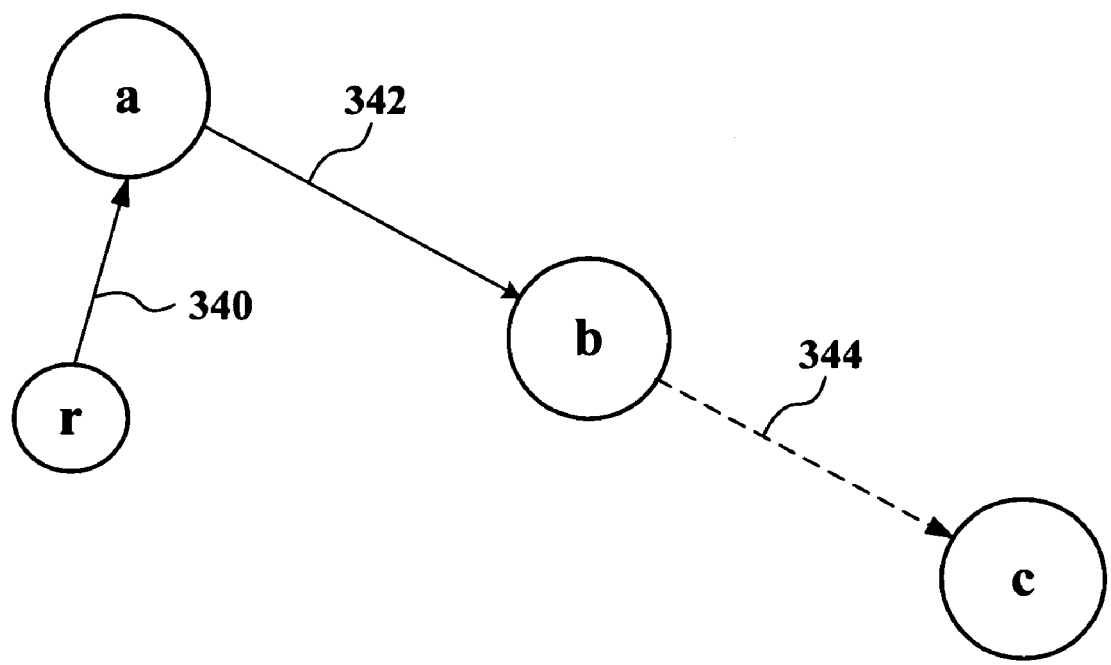
FIG. 3B illustrates an object hierarchy where 3 objects are being traced directly or indirectly from the root object.

FIG. 3B shows an object hierarchy. The Figure includes 3 objects "a", "b" and "c" which may be traced directly or indirectly from the root object, denoted by "r". The object "r" points to object "a" and object "a" points to object "b". The reference from object "b" to object "c" is added at a later stage as indicated by the dotted arrow 344.

Figure 3C:
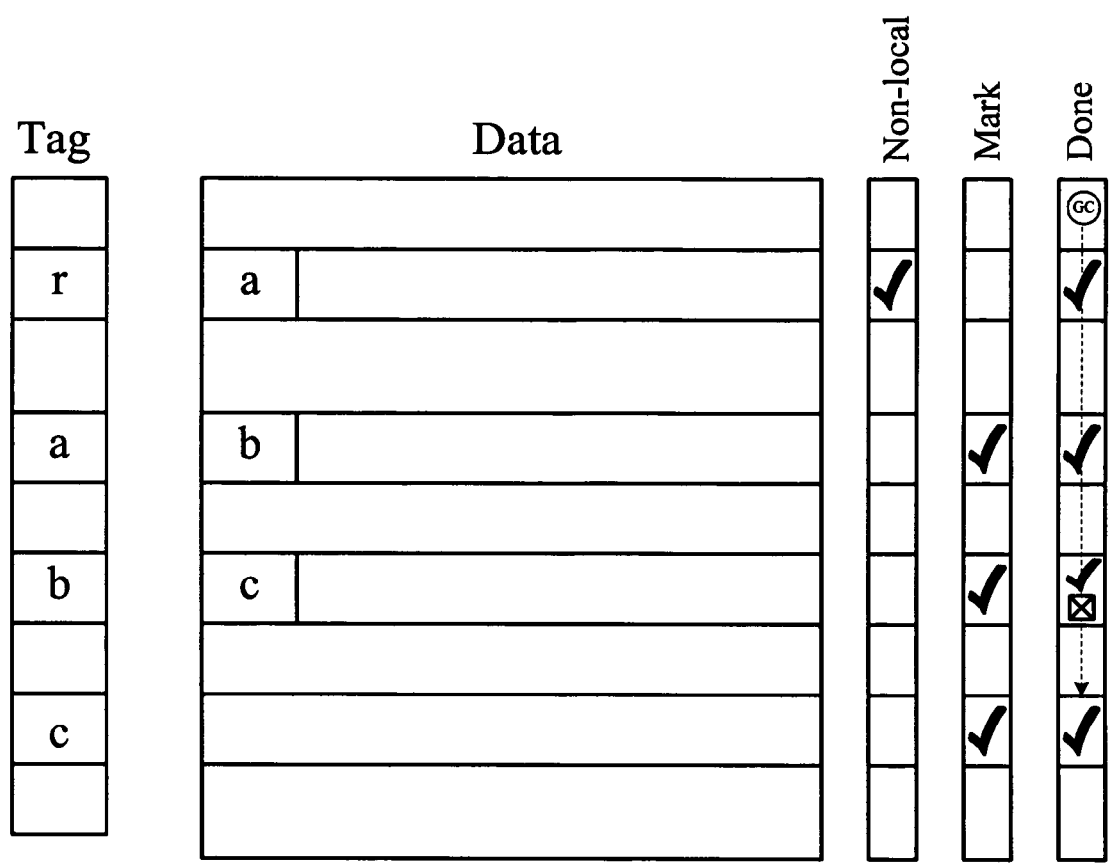
FIG. 3C illustrates the rescanning process as it relates to the three objects shown in FIG. 3B and the references they hold, in accordance with one embodiment of the invention.

Reference is made to FIG. 3B and FIG. 3C, which illustrates the process of setting the done bit by a garbage collector for the objects "a", "b" and "c". FIG. 3C shows a tag line (tag), which holds the identifier of an object that is being held in the object cache. In this case the ICGC will start scanning cache lines to find a set non-local bit, and the non-local bit is associated with the root object having tag "r" is set. The ICGC then sets the done bit of the cache line associated with the object "r", as indicated by the check marks.

The ICGC traces through the data and finds that object "r" references object "a". Therefore, the ICGC sets the mark bit of the cache line associated with object "a" as indicated by the check marks. Then the ICGC sets the done bit on the cache line associated with object "a" and scans this cache line next and finds a reference to object "b" in the data. The mark bit is used to indicate that the cache line contains live data. The done bit is used to indicate if the reference to an object within a cache line has been changed or modified and also to indicate that the cache line has been scanned by the ICGC.

In this example, the ICGC stops, as the reference from object "b" to "c" has not yet been added. Next, the ICGC will scan the done bits of all the cache lines prior to reclaiming the allocated memory of the objects that are not traceable from object "r". In the mean time, a reference from object "b" to object "c" is added. Now, when the ICGC reaches the done bit associated with object "b" it will be unset, as indicated by the check mark being crossed out. In this situation, the ICGC will rescan the cache line associated with object "b" and notice that object "b" references object "c", and the ICGC will not reclaim the memory allocated to object "c". The ICGC will then set the mark and done bits of the cache line associated with object "b" as shown by "X". As can be seen, the ICGC only rescans previously examined cache lines with unset done bits, thus saving a considerable amount of time as well as preventing erroneous reclamation of allocated memory of live objects. It should be understood that changing the done bit of object "b" to indicate a change in reference is only one example. It is also possible to set the mark bit of object "c" to indicate the reference change. In this case, when the mutator stores a reference, the mark bit is set and the ICGC may scan cache lines having the set mark bit.

Figure 4:
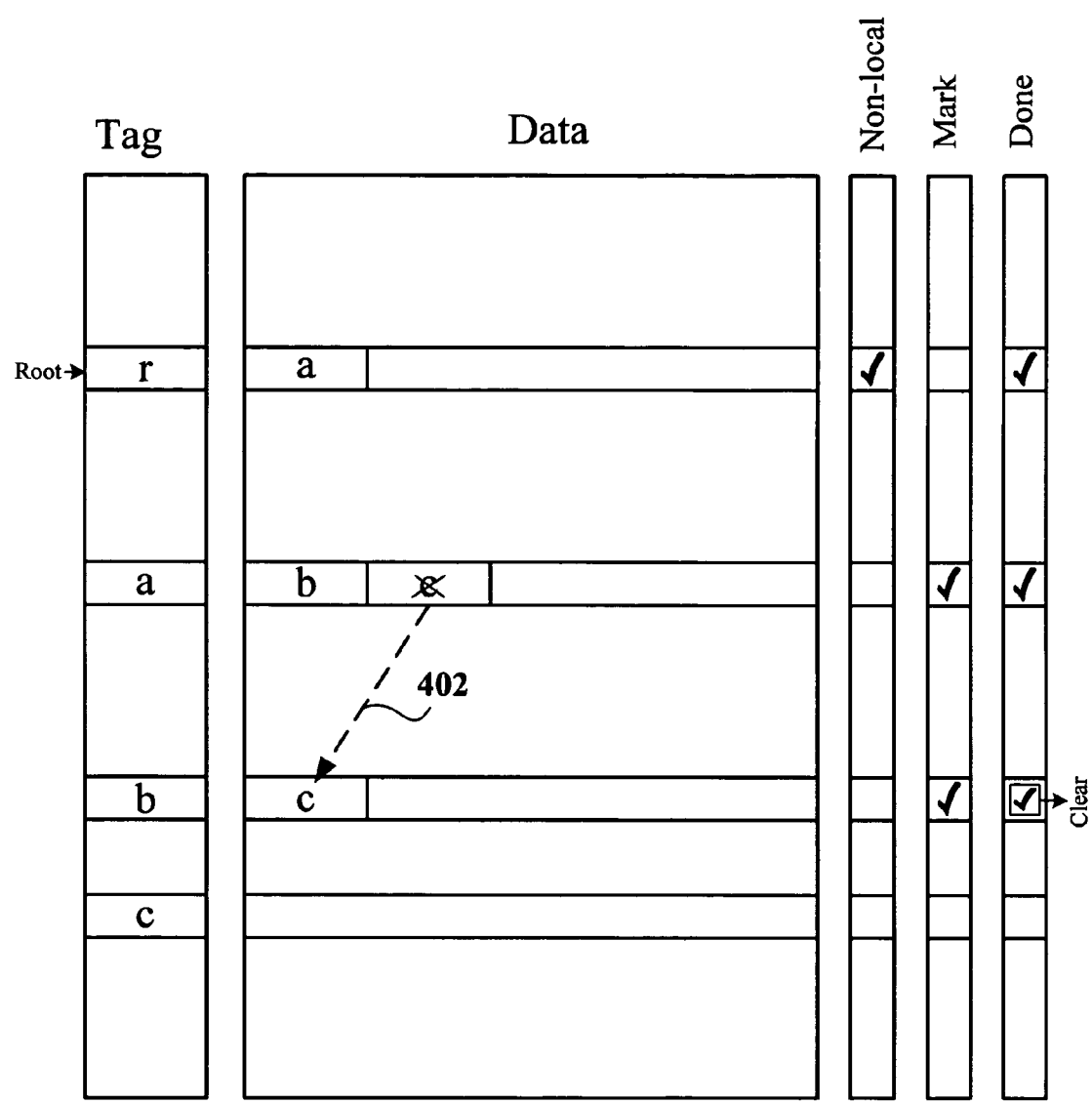
FIG. 4 illustrates the process of setting and unsetting of the done bit by the ICGC and the mutator respectively in accordance with one embodiment of the invention.

FIG. 4 is an exemplary object cache implementing an embodiment of the invention. The data line (data) contains the name(s) of the object or objects that are referenced by the object identified in the tag line (tag). FIG. 4 also shows the three bits associated with each cache line. The three bits are: the non-local bit, the mark bit and the done bit, in accordance with one embodiment of the invention. The garbage collector starts scanning a cache line having a root object, which is represented in the tag as "r". The garbage collector sets the done bit associated with the cache line having the root object "r". The garbage collector then traces the reference from the root object "r".

In FIG. 4, the object "r" in the tag points to object "a" in the data. Therefore, the garbage collector next scans the cache line with "a" in the tag. The garbage collector sets the mark bit and done bit of the cache line corresponding to object "a", as indicated by the check marks. As shown, object "a" points to object "b" and object "c" in the data. In the same manner, the garbage collector scans the cache line with object "b" in the tag next, but according to the illustration object "b" is not pointing to any object initially. Therefore the garbage collector only sets the mark and done bits corresponding to object "b", as indicated by check marks.

In this example, the reference from object "a" to object "c" is deleted by the mutator. Also, the mutator added a reference from object "b" to object "c" as shown by the dotted arrow 402. The mutator is designed to simultaneously unset the corresponding done bit of object "b", shown by the word "clear". In the preferred embodiment of the invention, the ICGC scans the state bits of the cache lines to see whether there is any unset done bit on a marked or non-local cache line prior to reclaiming the allocated memory of an object. Thus, when the ICGC scans the marked or non-local bits, the ICGC will notice that the done bit for the cache line corresponding to object "b" is unset. Therefore, the ICGC rescans the cache line corresponding to object "b" and will spot that object "b" references object "c" and therefore will not reclaim the allocated memory of object "c". The ICGC sets the done bit prior to rescanning the cache line corresponding to object "b".

Figure 5:
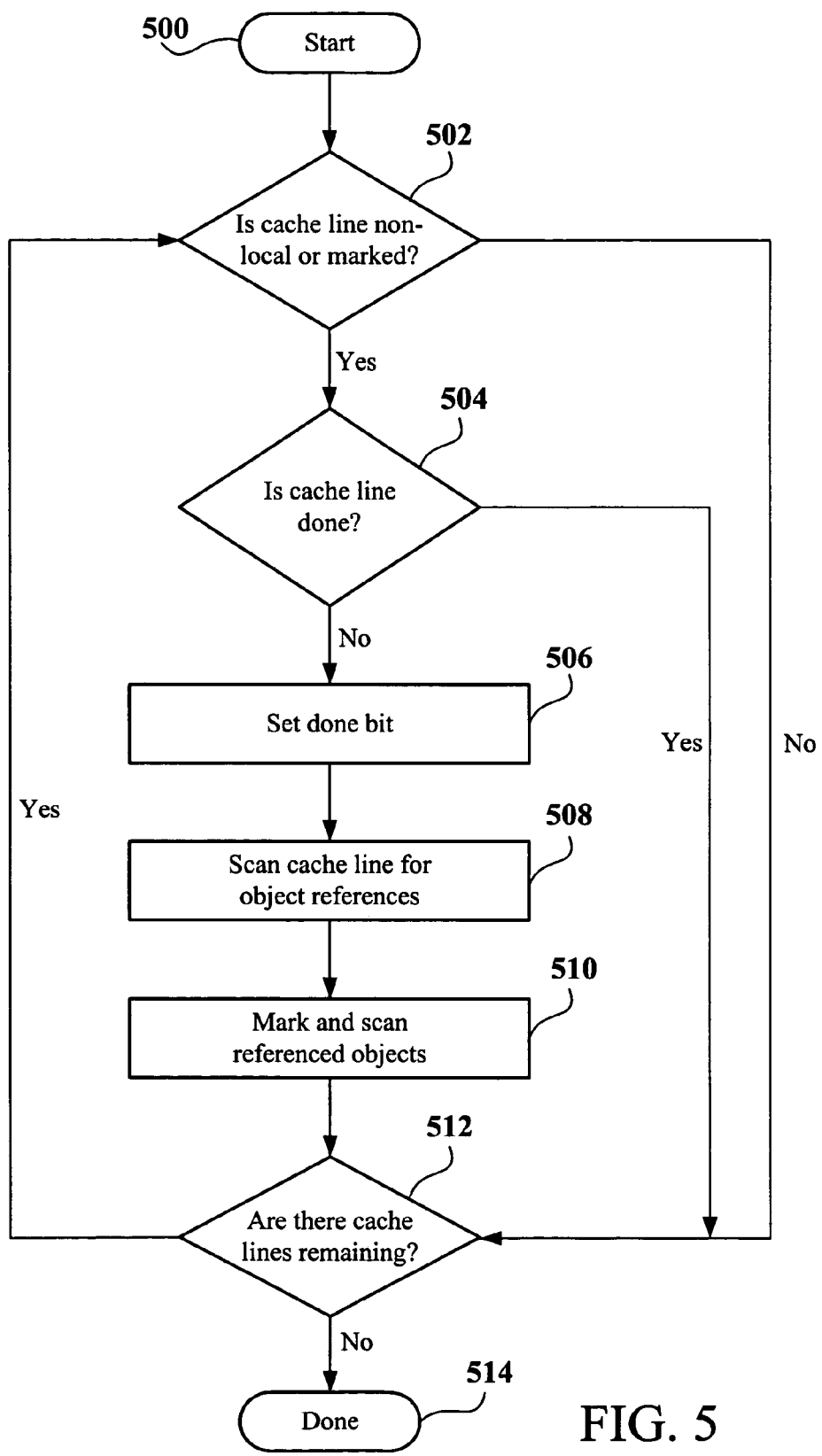
FIG. 5 illustrates a flow chart for rescanning cache lines by an ICGC, in accordance with one embodiment of the invention.

FIG. 5 illustrates a flow chart of the process for rescanning cache lines by a garbage collector when an object reference is modified. The process is initiated when the ICGC begins scanning cache lines for non-local or marked objects in operation 502. If the cache line is found not to be non-local or marked in operation 502 then the process ends and proceeds to operation 512 and ensures that there are no cache line remaining to be scanned. If the cache line is determined to be non-local or marked, then a determination is made to see whether the cache line done bit is set in operation 504. If the cache line done bit is set the process proceeds to the next cache line (if any) as indicated in operation 512. The set done bit indicates that the mutator did not change any object references. Therefore, the ICGC need not rescan the corresponding cache line. On the other hand, if a determination is made that the cache line done bit is not set in operation 504, then the done bit is set in operation 506. The unset done bit indicates that there were changes made to object references in the cache line. Therefore, the cache line is scanned for object references in operation 508.

Subsequently, the referenced objects are marked and scanned as indicated in operation 510. In operation 512, a determination is made as to whether there are any cache lines remaining, and if it is found that there are cache lines remaining, the process starts again from operation 502 else, the process ends with operation 514. After the completion of the operations 502-514, the ICGC reclaims any objects, which are neither non-local nor marked.

Figure 6:
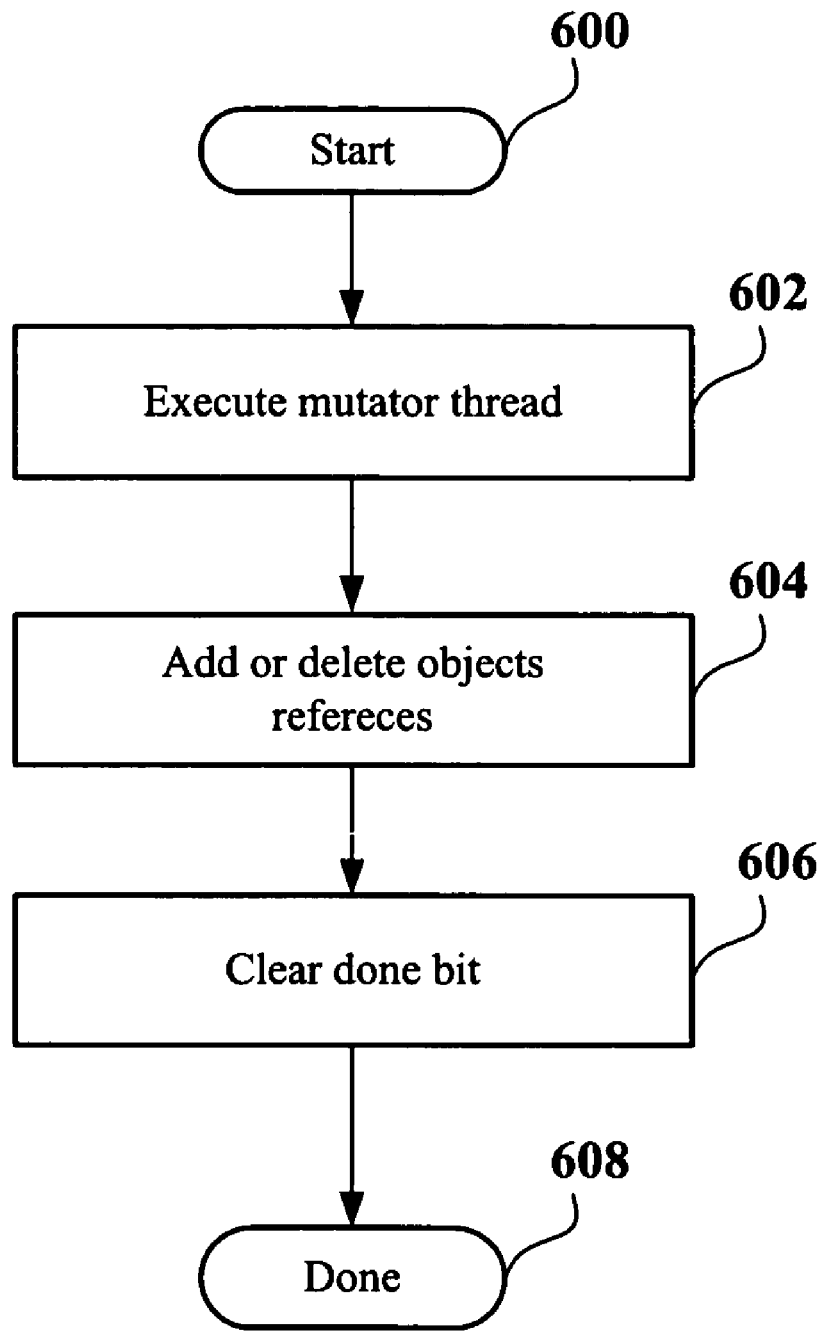
FIG. 6 illustrates a flow chart for unsetting the done bit by a mutator, in accordance with one embodiment of the invention.

In the present invention, the garbage collector is designed to rescan cache lines with modified object references. The rescanning is triggered when the ICGC identifies an unset done bit associated with a particular marked or non-local cache line. FIG. 6 presents a flow chart illustrating the process for unsetting done bits associated with cache lines by a mutator, as the mutator modifies object references. The process starts when a mutator begins application work in operation 602. Next, in operation 604, the mutator adds or modifies object references. The mutator then unsets the done bit as shown in operation 606 so that when the ICGC scans for unset done bits, the ICGC can identify unset bits and rescan the cache lines associated with the unset done bits. In cases where the done bit is not set, the mutator may add or modify object references as the ICGC is designed to rescan cache lines with unset done bits.

In one embodiment of the invention, the store-reference instruction of the processor is modified so that the done bit is cleared in hardware at the same time as the cache line is modified. A hardware implementation helps to maintain synchronization with the ICGC. This also enables elimination of overhead associated with software instructions, which improves time efficiency. Moreover, the embodiments of the invention track object reference updates at a finer granularity compared to software based garbage collection schemes i.e. at the level of cache lines.

Those skilled in the art will appreciate that the embodiments of the present invention are suitable for a number of configurations, irrespective of whether garbage collection and mutator execution occur concurrently or not. Even if garbage collection and mutator execution occur sequentially, the use of a done bit to indicate scanned objects continues to eliminate the need for rescanning these objects. In sequential systems, during a normal garbage collection pause, the garbage collector would still not have to rescan every object in the cache when a new reference to the object is located. This again saves work during the garbage collection phase and reduces pause times.

With the above embodiments in mind, it should be understood that the invention may be practiced with other computer system configurations including hand-held devices, microprocessor systems, microprocessor-based or programmable consumer electronics, minicomputers, mainframe computers and the like. Furthermore, the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which thereafter be read by a computer system. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for concurrent garbage collection and mutator execution in a computer system, comprising:
    examining a first cache line for a set non-local bit or mark bit;
    setting a done bit corresponding to the first cache line having a set non-local bit or mark bit, the first cache line being associated with a first object;
    scanning the first cache line for a reference to a second object;
    locating a second cache line containing a second object that is referenced by the first object;
    setting a mark bit corresponding to the second cache line;
    setting a done bit corresponding to the second cache line;
    scanning the previously examined first and second cache lines with set non-local bit or mark bit to identify cache lines with any unset done bits;
    re-setting the done bit of the identified cache lines; and
    rescanning the identified cache lines within a same garbage collection cycle upon re-setting the done bit to verify references, prior to reclaiming allocated memory.

2. A method for concurrent garbage collection and mutator execution in a computer system as recited in claim 1, wherein the first cache line is examined by a garbage collector.

3. A method for concurrent garbage collection and mutator execution in a computer system as recited in claim 2, wherein the second cache line is located by the garbage collector.

4. A method for concurrent garbage collection and mutator execution in a computer system as recited in claim 3, wherein the done bit is set by the garbage collector.

5. A method for concurrent garbage collection and mutator execution in a computer system as recited in claim 4, wherein the done bit is unset by a mutator thread.

6. A method for concurrent garbage collection and mutator execution in a computer system as recited in claim 5, wherein each cache line is rescanned by the garbage collector if the corresponding done bit is unset by the mutator thread.

7. A method for concurrent garbage collection and mutator execution in a computer system as recited in claim 1, further comprising:
    storing in the second object a reference to a third object; and
    unsetting the done bit corresponding to the second cache line upon storing references in the second object.

8. A method for concurrent garbage collection and mutator execution in a computer system as recited in claim 7 further, comprising:
    clearing the done bit in hardware upon storing the reference in the second object.

9. A method for concurrent garbage collection and mutator execution in a computer system as recited in claim 1, further comprising:
    storing in the second object a reference to a third object; and
    setting the mark bit corresponding to a third cache line upon storing references in the second object.

10. A method for concurrent garbage collection and mutator execution in a computer system as recited in claim 9, further comprising:
    setting the mark bit in hardware upon storing the reference in the second object.

11. A cache line for cache objects used in a computer system, comprising:
    the cache line being a data structure stored in memory of the computer system with a plurality of data bits, the cache line having,
    a first bit for designating the cache line as a root;
    a second bit for marking the cache line as live, the second bit associated with a non-root cache line referenced directly or indirectly from the root, the marking of the second bit based on marking of first bit for the cache line; and
    a third bit configured to define status of processing of the cache line by a garbage collector based on the markings of first and second bits, wherein a set status of the third bit indicating completion of scanning of the cache line by a garbage collection process and an unset status of the third bit identifying one of an incomplete scanning of the cache line by the garbage collection process or change to object references within the cache line alter completion of processing by the garbage collector within a same garbage collection circle, the status of the third bit driving the garbage collection process for the cache line.

12. A cache line as recited in claim 11, wherein the root defines a live object.

13. A cache line as recited in claim 12, wherein the second bit is set by a garbage collector.

14. A cache line as recited in claim 11, wherein the third bit is set by the garbage collector.

15. A cache line as recited in claim 14, wherein the third bit is unset to indicate modification to object references located in the cache line.

16. A cache line as recited in claim 15, wherein the unset third bit signals the garbage collector to rescan the cache line associated with the unset third bit.

17. A cache line as recited in claim 14, wherein the third bit is capable of being unset by a mutator.

18. A cache line as recited in claim 11, wherein the first bit identifies non-local cache lines.

19. A computer system having memory for storing cache lines of objects, the system comprising:
   a cache line, the cache line being a data structure in the memory with a plurality of data bits the cache line having,
   a first bit for designating the cache line as a root;
   a second bit for marking the cache line as being live, the second bit associated with a non-root cache line referenced directly or indirectly from the root the marking of the second bit based on marking, of first bit for the cache line; and
   a third bit configured to define status of processing of the cache line by a garbage collector based on the markings of first and second bits, wherein a set status of the third bit indicating completion of scanning of the cache line by a garbage collection process and an unset status of the third bit identifying one of an incomplete scanning of the cache line by the garbage collection process or change to object references within the cache line after completion of processing by the garbage collector within a same garbage collection cycle, the status of the third bit driving the garbage collection process for the cache line.

20. A computer system having memory for storing cache lines of objects as recited in claim 19, wherein the third bit is unset to indicate modification to object references.

21. A computer system having memory for storing cache lines of objects as recited in claim 20, wherein the unset third bit signals the garbage collector to rescan the cache line associated with the unset third bit.

22. A computer system having memory for storing cache lines of objects as recited in claim 19, wherein the third bit is capable of being unset by a mutator.

23. A non-object cache line in a computer system, the non-object cache line being a data structure stored in memory and configured to hold data bits, comprising:
   a first bit for marking the non-object cache line as live, the first bit associated with non-root cache line referenced directly or indirectly from a root; and
   a second bit configured to define status of processing of the non-object cache line by a garbage collector based on the marking of the first bit, wherein a set status of the second bit indicating completion of scanning of the non-object cache line by a garbage collection process and an unset status of the second bit identifying one of an incomplete scanning of the cache line by the garbage collection process or change to object references within the non-object cache line after completion of processing by the garbage collector within a same garbage collection cycle, the status of the second bit driving the garbage collection process for the non-object cache line.

* * * * *